(No Model.)
C. C. WEBB.
SASH CORD FASTENER.
No. 327,627. Patented Oct. 6, 1885.
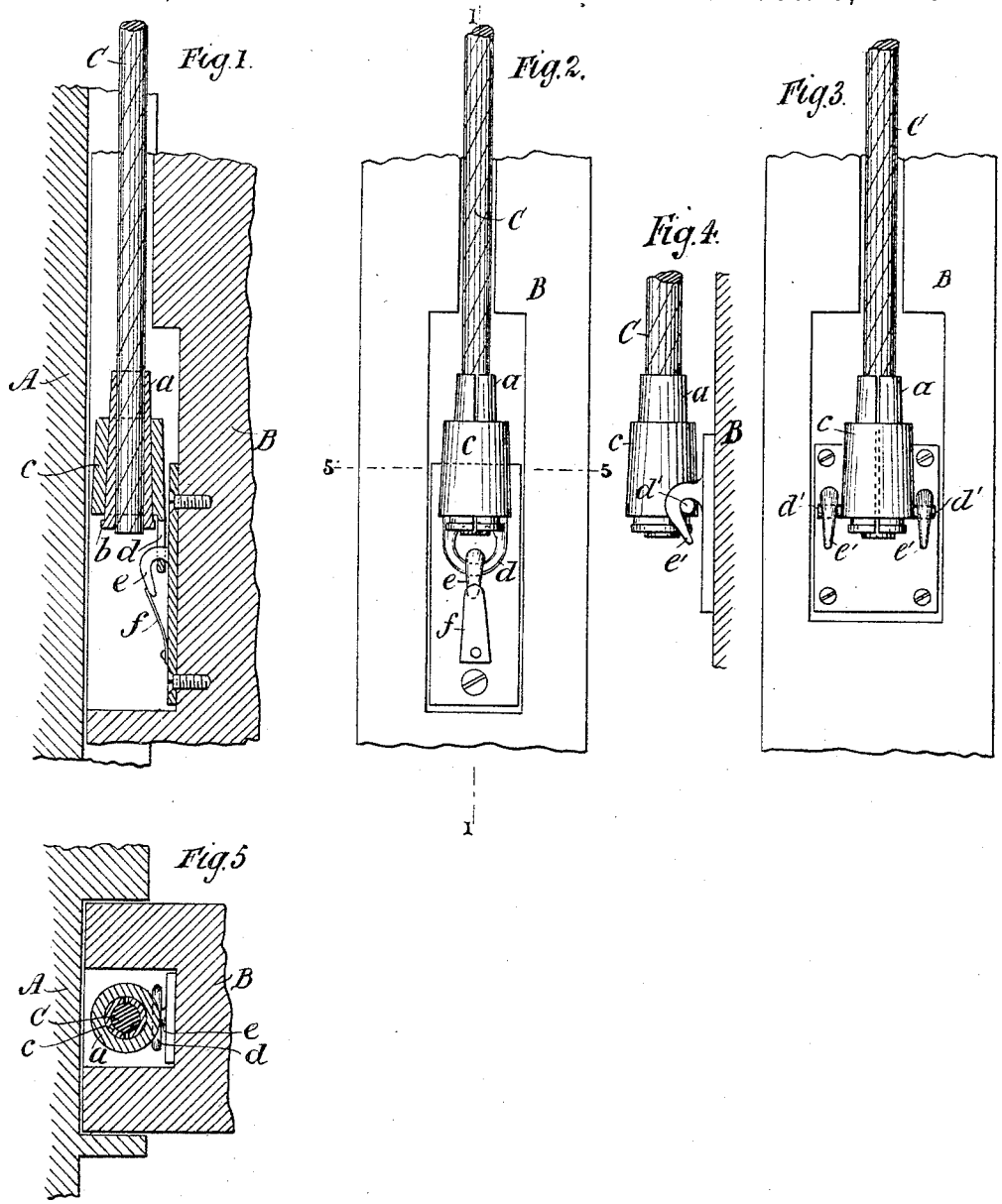
Witnesses
Daniel H. Driscoll
Wm. G. Lipsey
Inventor
Charles C. Webb
by Gifford & Brown
Attys.

UNITED STATES PATENT OFFICE.

CHARLES C. WEBB, OF NEW YORK, N. Y.

SASH-CORD FASTENER.

SPECIFICATION forming part of Letters Patent No. 327,627, dated October 6, 1885.

Application filed August 3, 1885. Serial No. 173,325. (No model.)

*To all whom it may concern:*

Be it known that I, CHARLES C. WEBB, of the city, county, and State of New York, have invented a new and useful Improvement in Means for Attaching Window-Cords to the Sash, of which the following is a specification.

Figure 1 represents a longitudinal section through the line 1 1 of Fig. 2. Fig. 2 represents the sash and window cord and attaching means, viewed from one side. Fig. 3 represents the same thing as Fig. 2 in a modified form. Fig. 4 is another view of the same thing shown in Fig. 3. Fig. 5 is a cross section through the line 5 5, Fig. 2.

Similar letters of reference designate corresponding parts in all the figures.

A is the window-frame.

B is the window-sash.

C is the window-cord, which occupies the same position relatively to the frame and sash as heretofore. Heretofore the window-cord has been generally secured to the sash by passing it through an eye and knotting it at the end. My improvement consists in substituting for this old contrivance a contrivance of substantially the following construction for securing the cord to the sash.

*a* is a split collar adapted to surround the cord and securely clamp the same. The exterior surface of this collar gradually tapers outward from its upper extremity toward its lower extremity, as clearly shown in Fig. 1. It is preferably provided at or near its lower extremity with a shoulder or flange, *b*.

*c* is a collar, the interior of which is formed conical to correspond with the form of the exterior of the collar *a*. The bore of this collar *c* is of such size that when the collar *a* is placed around the cord the collar *c* may be brought over the small end of the collar *a* and advanced somewhat toward the large end of the collar *a;* but the bore is not large enough to permit of the passage of the collar *a* through the collar *c*, and thus when the collar *c* is brought into the position shown in Fig. 1 it will wedge closely about the collar *a* and cause the latter to clamp the cord tightly. The shoulder or flange *b*, if present, will serve to prevent the collar *c* from, by any accident, passing over the large end of the collar *a*.

Upon the collar *c*, preferably in the position shown in the figures, is placed a ring, *d*. The connection between this ring and the collar *c* is preferably a pivotal connection.

Upon the window-sash is secured a hook, *e*, projecting outward in a position which adapts it to engage with the ring *d*. This hook is preferably provided with a guard-spring, *f*, to prevent the possibility of the ring escaping from the hook. In lieu of the ring a cross-bar may be placed on the collar *c*, to engage with two hooks secured to the sash. This modification is shown in Figs. 3 and 4, where *d'* represents the cross-bar, and *e' e'* represent the two hooks secured to the sash and adapted to engage one with each end of the cross-bar. This modification and other modifications which would suggest themselves to a constructor I consider the equivalent for the ring and hook which I have illustrated in Figs. 1 and 2.

In the use of my invention the hook *e* is generally secured to the frame of the window-sash by a plate, as illustrated in Fig. 1. Then the window-cord is passed through the collar *c* until its extremity projects considerably beyond. Then the two halves of the split collar *a* are placed near the extremity of the cord and the collar *c* is slid downward until it wedges against the collar *a*. Then the ring *d* is engaged with the hook *e*, and under these circumstances the continual strain from the window-weight tends to draw the collar *c* tightly down on the clamp *a*, and insures the hold which is obtained by the latter upon the window-cord. When, however, it is desired to detach the cord from the window, it is simply requisite to unhook the ring *d* from the hook *e*, and then, if it be further required to renew the cord, the attachments which I have described may be removed from the old cord by simply sliding the collar *c* upward, so as to relieve the pressure upon the collar *a*, when both collars may be readily taken off of the cord in condition to be applied to a new cord.

The means which I have thus described for securing the window-cord to the sash possess many advantages over the means heretofore in use, in that, while they afford a perfect and secure means for attachment, they may, when desired, be detached without difficulty, or without cutting the cord, which is especially desirable in case of removing the sash for cleaning or glazing.

What I claim as my invention, and desire to secure by Letters Patent, is—

In combination, the window-cord, the sash, the split collar encircling the cord and tapering on its exterior, a second collar encircling the first collar and tapering on its interior, a ring attached to the said second collar, and a hook adapted to engage therewith, and secured to the window-sash, all substantially as described.

CHARLES C. WEBB.

Witnesses:
DANIEL H. DRISCOLL,
WM. G. LIPSEY.